United States Patent
Gumpoltsberger et al.

(10) Patent No.: US 8,231,501 B2
(45) Date of Patent: *Jul. 31, 2012

(54) MULTI STEP TRANSMISSION

(75) Inventors: Gerhard Gumpoltsberger, Friedrichshafen (DE); Christian Sibla, Friedrichashafen (DE); Stefan Beck, Eriskirch (DE); Josef Haupt, Tettnang (DE); Gert Bauknecht, Friedrichshafen (DE); Peter Ziemer, Tettnang (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 97 days.

This patent is subject to a terminal disclaimer.

(21) Appl. No.: 12/859,403

(22) Filed: Aug. 19, 2010

(65) Prior Publication Data

US 2011/0045940 A1 Feb. 24, 2011

(30) Foreign Application Priority Data

Aug. 20, 2009 (DE) .......................... 10 2009 028 713

(51) Int. Cl.
*F16H 3/44* (2006.01)
(52) U.S. Cl. ........................................ 475/284
(58) Field of Classification Search ............... 475/269, 475/275, 278, 284, 296
See application file for complete search history.

(56) References Cited

U.S. PATENT DOCUMENTS

| | | | |
|---|---|---|---|
| 4,395,925 A | 8/1983 | Gaus | |
| 4,683,776 A | 8/1987 | Klemen | |
| 5,106,352 A | 4/1992 | Lepelletier | |
| 6,558,287 B2 | 5/2003 | Hayabuchi et al. | |
| 6,572,507 B1 | 6/2003 | Korkmaz et al. | |
| 6,634,980 B1 | 10/2003 | Ziemer | |
| 6,860,831 B2 | 3/2005 | Ziemer | |
| 6,955,627 B2 | 10/2005 | Thomas et al. | |
| 6,960,149 B2 | 11/2005 | Ziemer | |
| 6,991,578 B2 | 1/2006 | Ziemer | |
| 7,549,942 B2 | 6/2009 | Gumpoltsberger | |
| 7,556,582 B2 | 7/2009 | Gumpoltsberger | |
| 7,566,283 B2 | 7/2009 | Gumpoltsberger | |

(Continued)

FOREIGN PATENT DOCUMENTS

DE 26 36 969 A1 2/1978

(Continued)

OTHER PUBLICATIONS

U.S. Appl. No. 12/859,405, filed Aug. 2010, Gumpoltsberger et al.*

(Continued)

*Primary Examiner* — David D Le
*Assistant Examiner* — Stacey Fluhart
(74) *Attorney, Agent, or Firm* — Davis & Bujold, P.L.L.C.

(57) ABSTRACT

A multi step transmission comprising gear sets, shafts and shift elements. The sun gear of set (P1) couples drive shaft (1). The carrier of set (P1) couples shaft (3) which couples, via brake (03), housing (G). Shaft (3) couples shaft (1), via clutch (13), and shaft (5) via clutch (35). Shaft (5) couples the ring and sun gears of sets (P2, P4) respectively, and shaft (8), which couples the sun gear of set (P3), via clutch (58). Shaft (1) couples shaft (7) which couples, via clutch (17), the carrier of set (P4). Shaft (6) couples the ring gear of set (P1) and the carrier of set (P2). The sun gear of set (P2) couples shaft (4) which couples, via brake (04), housing (G). The ring gear of set (P3) couples housing (G). Output shaft (2) couples the ring gear and carrier of sets (P4, P3) respectively.

5 Claims, 2 Drawing Sheets

U.S. PATENT DOCUMENTS

Figure 1:
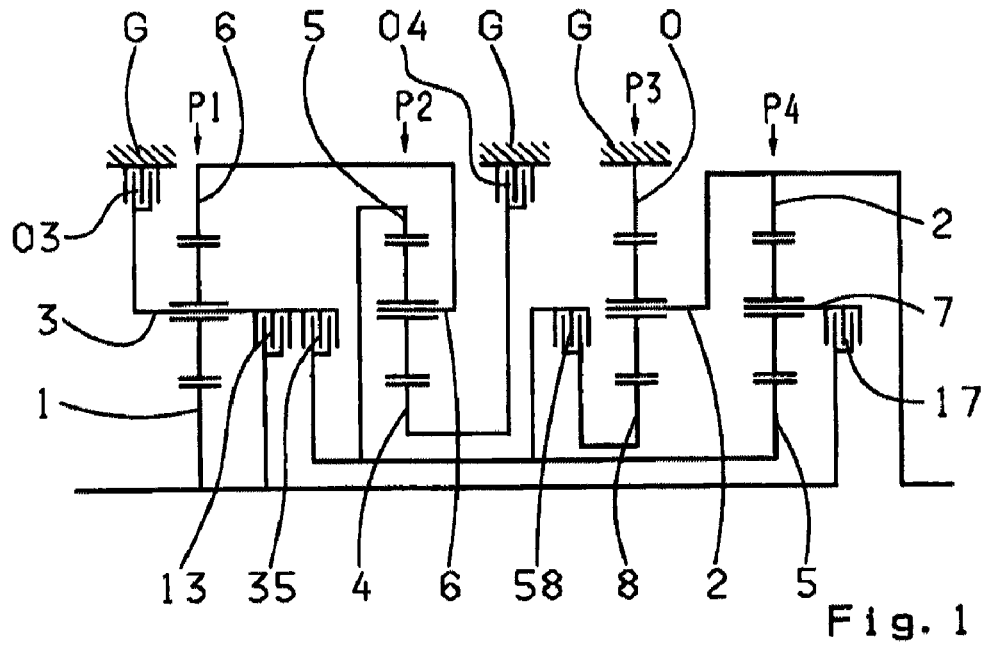

| | | | |
|---|---|---|---|
| 7,699,743 B2 | 4/2010 | Diosi et al. | |
| 7,959,531 B2 * | 6/2011 | Phillips et al. | 475/276 |
| 7,985,159 B2 * | 7/2011 | Phillips et al. | 475/284 |
| 2007/0213168 A1 * | 9/2007 | Gumpoltsberger | 475/275 |
| 2008/0161149 A1 | 7/2008 | Diosi et al. | |
| 2008/0261756 A1 | 10/2008 | Carey et al. | |
| 2009/0011891 A1 | 1/2009 | Phillips et al. | |
| 2009/0048059 A1 | 2/2009 | Phillips et al. | |
| 2010/0048344 A1 | 2/2010 | Kamm et al. | |
| 2011/0009228 A1 | 1/2011 | Bauknecht et al. | |

FOREIGN PATENT DOCUMENTS

| | | |
|---|---|---|
| DE | 29 36 969 A1 | 4/1981 |
| DE | 199 12 480 A1 | 9/2000 |
| DE | 199 49 507 A1 | 4/2001 |
| DE | 101 15 983 A1 | 10/2002 |
| DE | 101 15 987 A1 | 10/2002 |
| DE | 101 15 995 A1 | 10/2002 |
| DE | 102 13 820 A1 | 10/2002 |
| DE | 10 2005 010 837 A1 | 9/2005 |
| DE | 10 2004 040 597 A1 | 2/2006 |
| DE | 10 2005 002 337 A1 | 8/2006 |
| DE | 10 2005 010 210 A1 | 9/2006 |
| DE | 10 2005 032 881 A1 | 1/2007 |
| DE | 10 2006 006 622 A1 | 9/2007 |
| DE | 10 2006 006 636 A1 | 9/2007 |
| DE | 10 2006 006 637 A1 | 9/2007 |
| DE | 10 2008 000 428 | 2/2008 |
| DE | 10 2008 007 574 A1 | 8/2008 |
| DE | 10 2008 016 084 A1 | 10/2008 |
| DE | 10 2008 016 084 A1 | 10/2008 |
| DE | 10 2008 000 428 A1 | 9/2009 |
| EP | 0 434 525 A1 | 6/1991 |
| JP | 2005 036955 A | 2/2005 |
| JP | 2005061445 A | 3/2005 |
| JP | 2006-349153 A | 12/2006 |
| JP | 2006349153 A | 12/2006 |
| WO | 2009/106408 A1 | 9/2009 |

OTHER PUBLICATIONS

Gumpoltsberger, Gehard: Systematische Synthese and Bewertung von mehrgangigen Planetengetrieben. Dissertation, TU Chemnitz, 2007 das ges. Dokument, insbes, Kap 1.2.

Gumpoltsberger, Gerhard: Systematic Synthesis and Evaluation of Multi-Stage Planetary Transmissions, Dissertation TU Chemnitz, 2007.

Gumpoltsberger, Gerhard: Synthesis of Planetary Transmissions, ZF Friedrichshafen AG, 2009, 13 pages, Germany.

* cited by examiner

|  | 03 | 04 | 13 | 17 | 35 | 58 | i | phi |
|---|---|---|---|---|---|---|---|---|
| 1. GEAR |  | X |  |  | X | X | 5.714 | 1.822 |
| 2. GEAR |  |  | X |  | X | X | 3.136 | 1.427 |
| 3. GEAR |  | X | X |  |  | X | 2.197 | 1.386 |
| 4. GEAR |  | X |  | X |  | X | 1.585 | 1.330 |
| 5. GEAR |  | X | X | X |  |  | 1.192 | 1.192 |
| 6. GEAR |  |  | X | X | X |  | 1.000 | 1.170 |
| 7. GEAR |  | X |  | X | X |  | 0.854 | 1.177 |
| 8. GEAR | X |  |  | X | X |  | 0.726 | 1.142 |
| 9. GEAR | X | X |  | X |  |  | 0.635 | 8.992 |
| R GEAR | X | X |  |  |  | X | −6.039 | −1.057 |

Fig. 3

MULTI STEP TRANSMISSION

This application claims priority from German Application No. 10 2009 028 713.2 filed Aug. 20, 2009.

FIELD

The present invention relates to a multi step transmission of a planetary design, in particular an automatic transmission for a motor vehicle.

BACKGROUND

According to the prior art, automatic transmissions, particularly for motor vehicles, comprise planetary gear sets that are shifted using friction elements or shift elements such as clutches and brakes, and typically are connected to a start-up element, such as a hydrodynamic torque converter or a fluid coupling, that is subject to a slip effect and is optionally provided with a lock-up clutch.

Such an automatic transmission is known, for example, from the applicant's DE 199 49 507 A1, according to which two non-shiftable front-mounted gear sets are provided on the drive shaft and generate two rotational speeds on the output side, which, in addition to the rotational speed of the drive shaft, can be selectively meshed with a shiftable double planetary gear set, acting on the output shaft by selective engagement of the shift elements such that only one of the two currently actuated shift elements must be engaged or disengaged to shift from one gear to the next higher or lower gear.

By using five shift elements, seven forward gears are produced; by using six shift elements, nine or ten forward gears are produced.

Furthermore, a multi step automatic transmission with eight forward gears and one reverse gear is known from DE 102 13 820 A1, and it comprises a first input path T1 of a first transmission ratio; an input path T2, which features a larger transmission ratio than the input path T1; a planetary gear set of the Ravigneaux type with four elements, wherein the four elements are placed as a sequence of elements in a rotational speed diagram as a first element, a second element, a third element and a fourth element; a clutch C-2, which transfers torque of input path T2 to the first element S3, a clutch C-1, which transfers the torque of input path T2 to the fourth element S2; a clutch C-4, which transfers torque of input path T1 to the first element; a clutch C-3, which transfers the torque of input path T1 to the second element C3; a brake B-1, which produces meshing of the fourth element; a brake B-2, which produces meshing of the second element; and a drive element, which is coupled with the third element S3.

Furthermore, a 9-speed multi step transmission is known from DE 29 36 969 A1; it comprises eight shift elements and four gear sets, wherein one gear set serves as a front-mounted gear set and the main gearing includes a Simpson set and a further gear set serves as reverse gearing.

Additional multi step transmissions are, for example, known from the applicant's DE 102005010210 A1 and DE 102006006637 A1.

Automatically shiftable vehicle transmissions, of planetary design, are already described in principle numerous times in the prior art and continually undergo further development and improvement. These transmissions should have a relatively simple design, in particular requiring a low number of shift elements, and avoid the need for double shifting when sequential shifting is performed, thereby ensuring that only one shift element is ever switched when shifting is performed in defined groups of gears.

The applicant's document DE 102008000428.3, which is not yet published, discloses a multi step transmission of a planetary design that includes an input shaft and an output shaft, which are arranged in a housing. The known transmission provides at least four planetary gear sets which are designated, in the following, as the first, second, third, and fourth planetary gear sets, at least eight rotatable shafts, which are designated in the following as the drive shaft, output shaft, third, fourth, fifth, sixth, seventh and eighth shafts, and at least six shift elements comprising brakes and clutches, whose selected engagement produces different transmission ratios between the input shaft and the output shaft, and thus preferably nine forward gears and one reverse gear can be produced.

The first and second planetary gear sets, which are preferably designed as minus planetary gear sets, form a shiftable front-mounted gear set, wherein the third and fourth planetary gear sets form a main gear set.

In the known multi step transmission, the carriers of the first and second planetary gear sets are coupled together via the fourth shaft, which is connected to an element of the main gear set, the ring gear of the first planetary gear set is coupled to the sun gear of the second planetary gear set via the eighth shaft, which is detachably connectable to the drive shaft via a first clutch, and the sun gear of the first planetary gear set can be coupled to a transmission housing by means of the third shaft, via a first brake, and is detachably connectable to the drive shaft via a second clutch, wherein the ring gear of the second planetary gear set can be coupled to a transmission housing by means of the fifth shaft, via a second brake. In addition, the seventh shaft is constantly connected to at least one element of the main gear set, and can be coupled to a transmission housing via a third brake, the sixth shaft is constantly connected to at least one further element of the main gear set and is detachably connectable to the drive shaft, via a third clutch; the output shaft is constantly connected at least to one further element of the main gear set.

In the known transmission, the fourth shaft is preferably constantly connected to the ring gear of the third planetary gear set, the sixth shaft is constantly connected to the ring gear of the fourth planetary gear set and the carrier of the third planetary gear set, and is detachably connectable to the drive shaft via the third clutch. Furthermore, the seventh shaft is constantly connected to the sun gears of the third and fourth planetary gear sets, and can be coupled to a transmission housing via the third brake. In this case, the output drive is produced via the output shaft, which is constantly connected to the carrier of the fourth planetary gear set. Furthermore, the third and fourth planetary gear sets can be combined or reduced to a Ravigneaux set by having a common carrier and a common ring gear.

SUMMARY

The objective of the present invention is to propose a multi step transmission of the initially described type, which features nine forward gears and at least one reverse gear, with a sufficient transmission ratio, in which the construction expenditure and the overall size, in particular the overall length and weight, are optimized, and additionally, in which efficiency is improved with respect to drag losses and gearing losses. In addition, in the multi step transmission according to the invention, minimal support moments should be exerted on the shift elements. According to the invention, the transmission should be particularly suited for a front transverse construction.

Correspondingly, a multi step transmission, according to the invention, of a planetary design is proposed, featuring an input shaft and an output shaft, which are arranged in a housing. In addition, at least four planetary gear sets are provided and which are designated, in the following, as the first, second, third, and fourth planetary gear sets, eight rotatable shafts, which are designated, in the following, as the drive shaft, output shaft, third, fourth, fifth, sixth, seventh and eighth shaft, and at least six shift elements comprising brakes and clutches, are selectively engaged to produce different transmission ratios between the drive shaft and the output shaft, such that preferably nine forward gears and one reverse gear can be realized.

The planetary gear sets, viewed axially, are aligned in the sequence of first planetary gear set, second planetary gear set, third planetary gear set, fourth planetary gear set, and are preferably designed as minus planetary gear sets.

As is well known, a simple minus planetary gear set comprises a sun gear, a ring gear, and a carrier, on which the planetary gears are rotatably supported, while the planetary gears mesh with the sun gear and the ring gear. As a result, when the carrier is held in place, the ring gear has a rotational direction that is opposite to that of the sun gear. In contrast, a simple plus planetary gear set comprises a sun gear, a ring gear and a carrier, on which inner and outer planet gears are rotatably supported, wherein all inner planet gears mesh with the sun gear and all outer planet gears mesh with the ring gear, wherein each inner planet gear meshes with only one outer planet gear. As a result, when the carrier is held in place, the ring gear has the same rotational direction as the sun gear.

According to the preferable embodiment of the invention, the sun gear of the first planetary gear set is connected to the drive shaft, wherein the carrier of the first planetary gear set is connected to the third shaft, which can be coupled to the transmission housing via first a brake, is detachably connectable via the second clutch to the fifth shaft, the fifth shaft is connected to the ring gear of the second planetary gear set and the sun gear of the fourth planetary gear set, and via the fourth clutch is detachably connectable to the eighth shaft, which is connected to the sun gear of the third planetary gear set, the drive shaft is detachably connectable to the seventh shaft, which is connected to the carrier of the fourth planetary gear set, via a third clutch.

In addition, the ring gear of the first planetary gear set is connected to the sixth shaft, which is connected to the carrier of the second planetary gear set, the ring gear of the third planetary gear set is coupled to a transmission housing, and the sun gear of the second planetary gear set is connected to the fourth shaft, which can be coupled to a transmission housing via a second brake, and the output shaft is connected to the ring gear of the fourth planetary gear set and to the carrier of the third planetary gear set.

Thereby it is provided that the first planetary gear set is blockable by engaging a first clutch, wherein the first coupling is preferably designed as clutch, which detachably connects the third shaft to the drive shaft, or it is designed as clutch, which detachably connects the third shaft to the sixth shaft.

The embodiment of the multi step transmission, according to the invention, results in transmission ratios that are particularly suitable for passenger vehicles, and in a greater overall gear ratio of the multi step transmission, thereby improving driving smoothness and significantly reducing fuel consumption.

Furthermore, construction expenditure is significantly reduced with the multi step transmission, according to the invention, due to a small number of shift elements. According to the invention, the multi step transmission offers the advantage of performing the start-up with a hydrodynamic converter, an external start-up clutch, or even with other suitable external start-up elements. It is also conceivable to perform the start-up using a start-up element integrated into the transmission. Preferably, a shift element that is actuated in the first forward gear and in the reverse gear is suitable.

Moreover, the multi step transmission, according to the invention, results in good efficiency in the main drive gears with respect to drag losses and gearing losses.

Furthermore, low moments occur in the shift elements and in the planetary gear sets of the multi step transmission, thereby advantageously reducing wear in the multi step transmission. In addition, the low moments make it possible to utilize correspondingly low dimensions, thereby reducing the necessary installation space and related costs. Furthermore, the rotational speeds of the shafts, shift elements, and planetary gear sets are low.

In addition, the transmission, according to the invention, is designed to allow adaptability to different drive-train embodiments in terms of power flow direction and spatial aspects.

BRIEF DESCRIPTION

Figure 2:
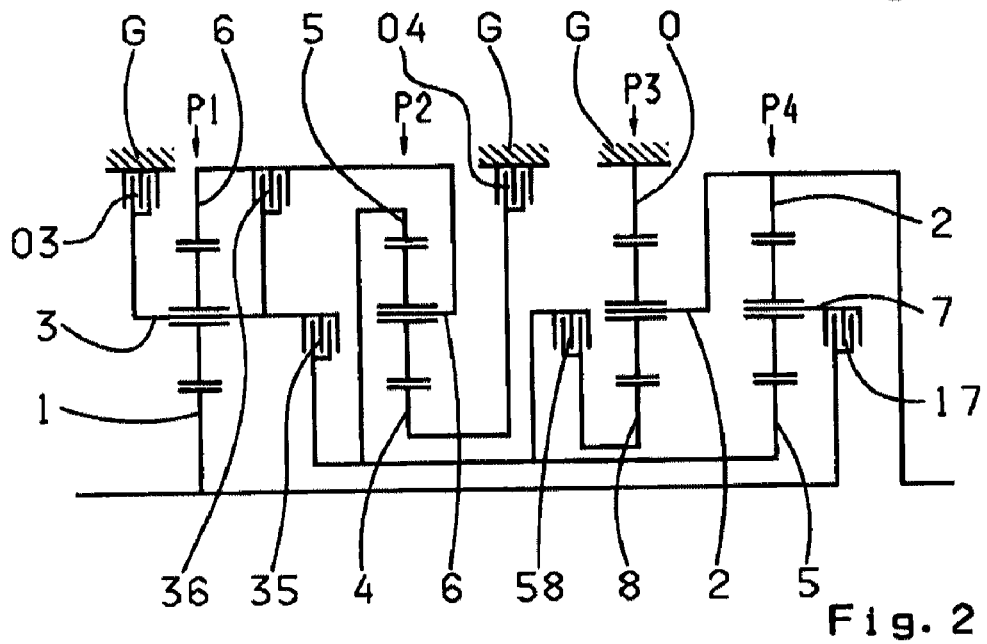

The invention is described in greater detail in the following examples, supported by the attached figures. They show:

FIG. 1: a schematic view of a first preferred embodiment of a multi step transmission according to the invention;

FIG. 2: a schematic view of a second preferred embodiment of a multi step transmission according to the invention; and FIG. 3: an example of a shift pattern for a multi step transmission according to FIG. 1.

DETAILED DESCRIPTION

FIG. 1 shows a multi step transmission, according to the invention, which has a drive shaft 1, an output shaft 2, and four planetary gear sets P1, P2, P3 and P4, which are arranged in a housing G. Planetary gear sets P1, P2, P3 and P4, in the example shown in FIG. 1, are designed as minus planetary gear sets. According to the invention, at least one planetary gear set can be implemented as a plus planetary gear set, if the carrier and ring gear connection are switched and, simultaneously, the value of the stationary transmission ratio is increased by 1 in comparison to the embodiment as a minus planetary gear set.

In the embodiment shown, the planetary gear sets, viewed axially, are arranged in the sequence P1, P2, P3 and P4.

As depicted in FIG. 1, six shift elements are provided, namely, two brakes, 03, 04, and four clutches 13, 35, 17 and 58. The spatial disposition of the shift elements can be arbitrary, and is only limited by the dimensions of the outer design. The clutches and the brakes of the transmission are preferably designed as friction shift elements or lamellar shift elements.

Using these shift elements, selective shifting of nine forward gears and one reverse gear can be realized. The multi step transmission, according to the invention, has a total of eight rotatable shafts, namely, the shafts 1, 2, 3, 4, 5, 6, 7 and 8, wherein the drive shaft constitutes the first shaft, and the output shaft the second shaft of the transmission.

According to the invention, the multi step transmission, as shown in FIG. 1, provides that the sun gear of the first planetary gear set P1 is connected to the drive shaft 1, wherein the carrier of the first planetary gear set P1 is connected to the third shaft 3, which can be coupled to a transmission housing G via a first brake 03, is detachably connectable to the drive shaft 1 via a first clutch 13 and to the fifth shaft 5 via a second shaft 35. With the aid of the engagement of the first clutch 13, the first planetary gear set P1 can be blocked by coupling the sun gear with the carrier.

As depicted in FIG. 1, the fifth shaft 5 is connected to the ring gear of the second planetary gear set P2 and the sun gear of the fourth planetary gear set P4, and via a fourth clutch 58, is detachably connectable to the eighth shaft 8, which is connected to the sun gear of the third planetary gear set P3, wherein the drive shaft 1 is detachably connectable, via a third clutch 17, to the seventh shaft 7 which is connected to the carrier of the fourth planetary gear set P4.

According to the invention, the ring gear of the first planetary gear set P1 is connected to the sixth shaft 6, which is connected to the carrier of the second planetary gear set P2, the ring gear of the third planetary gear set P3 is coupled to a transmission housing G (shaft 0), and the sun gear of the second planetary gear set P2 is connected to the fourth shaft 4, which can be coupled with the transmission housing G via a second brake 04; the output shaft 2 is connected to the carrier of the third planetary gear set P3 and the ring gear of the fourth planetary gear set P4.

According to the invention, the first clutch 13 and the second clutch 35, viewed axially, can be aligned between the first and the second planetary gear set P1, P2, wherein the fourth clutch 58, viewed axially, is preferably aligned between the second and the third planetary gear set P2, P3, and the third clutch 17, viewed axially in the direction of the power flow in traction mode, can be situated after the fourth planetary gear set P4.

The design example shown in FIG. 2 differs from the design example per FIG. 1 by the feature, that the first clutch is designed as clutch 36, via which the third shaft 3 is detachably connectable to the sixth shaft 6, so that blocking the first planetary gear set P1 can be performed by coupling the carrier of the first planetary gear set P1 with the ring gear of the first planetary gear set P1.

FIG. 3 shows an example of a shift schematics of a multi step transmission according to FIG. 1. Three shift elements are engaged for every gear. The shift schematics shows, based on examples, the particular transmission ratios i of the individual gear steps, and, to be determined therefrom, the gear increments or step changes phi to the next higher gear, wherein the value 8.992 is the transmission ratio spread.

Typical values for the stationary transmission ratios of the planetary gear sets P1, P2, P3 and P4 implemented as minus planetary gear sets are: −1.953, −2.191, −2.235 and −2.404, respectively. FIG. 3 shows that double shifting or group shifting is avoided when shifting sequentially, since two adjacent gear steps share two shift elements. It is also shown that a large transmission ratio spread is attained with small gear increments.

The first forward gear results from the engagement of the second brake 04 and the second and fourth clutches 35, 58; the second forward gear results from the engagement of the first, second and fourth clutches 13, 35, 58; the third forward gear results from the engagement of the second brake 04 and the first and fourth clutches 13, 58; the fourth forward gear results from the engagement of the second brake 04 and the third and fourth clutches 17, 58; the fifth forward gear results from the engagement of the second brake 04 and first and third clutches 13, 17; the sixth forward gear, preferably designed as the direct gear, results from the engagement of the first, second and third clutches 13, 35, 17; the seventh forward gear results from the engagement of the second brake 04 and the second and third clutches 35, 17; the eighth forward gear results from the engagement of the first brake 03 and the second and third clutches 35, 17, and that the ninth forward gear results from the engagement of the first and second brakes 03, 04 and the third clutch 17; wherein the reverse gear results from the engagement of the first and second brakes 03, 04 and the fourth clutch 58.

Since the second brake 04 and the fourth clutch 58 are engaged in the first forward gear and in the reverse gear, these shift elements can be used as start-up elements.

In the instance according to the design example per FIG. 2, the first clutch is designed as clutch 36, via which the third shaft 3 is detachably connectable to the sixth shaft 6, the resulting gears can be derived according to the shift schematics per FIG. 3, with the difference that the reference character 36 replaces reference character 13.

According to the invention, different gear increments can also result from the same gear schematics depending on the shift logic, thereby allowing an application-specific or vehicle-specific variation.

According to the invention, it is possible to provide additional freewheels at each suitable location of the multi stepped transmission, for example, between a shaft and the housing, or possibly to connect two shafts.

According to the invention, an axle differential and/or a distributor differential can be disposed on the drive side or on the output side.

Within the scope of an advantageous development, the drive shaft 1 can be separated from a drive motor, as needed, by a clutch element, wherein a hydrodynamic converter, a hydraulic clutch, a dry start-up clutch, a wet start-up clutch, a magnetic powder clutch, or a centrifugal clutch can be used as the clutch element. It is also possible to situate such a start-up element in the power flow direction after the transmission wherein, in this case, the drive shaft 1 is continuously connected to the crankshaft of the engine.

The multi step transmission, according to the invention, also makes it possible to situate a torsional-vibration damper between the engine and the transmission.

Within the scope of a further, not represented embodiment of the invention, a wear-free brake, for instance a hydraulic or electric retarder or the like, can be situated on each shaft, preferably on the drive shaft 1 or the output shaft 2, which is of special significance for use particularly in commercial vehicles. Furthermore, a power take-off drive can be provided on each shaft, preferably on the drive shaft 1 or the output shaft 2, for driving additional assemblies.

The friction shift elements that are used can be designed as power shiftable clutches or brakes. In particular, force locking clutches or brakes can be used, for instance, lamellar clutches, band brakes, and/or cone clutches.

A further advantage of the multi step transmission presented here is that an electric machine can be attached to each shaft as a generator and/or as an additional drive machine.

Obviously, any structural embodiment, in particular any spatial disposition of the planetary gear sets and the shift elements individually and relative to each other, and insofar as it is technically expedient, falls under the scope of protection of the present claims, without influencing the function of the transmission as specified in the claims, even if these embodiments are not explicitly represented in the figures or in the description.

The invention claimed is:

1. A multi step transmission of a planetary design for an automatic transmission for a motor vehicle, the multi-step transmission comprising:
a drive shaft (1);
an output shaft (2);

first, second, third and fourth planetary gear sets (P1, P2, P3, P4) which are arranged within a transmission housing (G); and a rotatable third shaft (3), a rotatable fourth shaft (4), a rotatable fifth shaft (5), a rotatable sixth shaft (6), a rotatable seventh shaft (7) and a rotatable eighth shaft (8) as well as at least six shift elements (03, 04, 13, 17, 35, 36, 58) comprising first and second brakes (03, 04) and first, second, third and fourth clutches (13, 17, 35, 36, 58) whose selective engagement produces different transmission ratios, between the drive shaft (1) and the output shaft (2), so that nine forward gears and a reverse gear can be achieved;

wherein a sun gear of the first planetary gear set (P1) is connected to the drive shaft (1);

a carrier of the first planetary gear set (P1) is connected to the third shaft (3) which is connectable to the transmission housing (G) via the first brake (03), the third shaft (3) is detachably connectable, via the second clutch (35), to the fifth shaft (5) which is permanently connected to a ring gear of the second planetary gear set (P2) and a sun gear of the fourth planetary gear set (P4), and the fifth shaft (5) is detachably connectable, via the fourth clutch (58), to the eighth shaft (8) which is connected to a sun gear of the third planetary gear set (P3);

the drive shaft (1) is detachably connectable to the seventh shaft (7) which is connected to a carrier of the fourth planetary gear set (P4) via the third clutch (17);

the sixth shaft (6) is connected to a ring gear of the first planetary gear set (P1) and a carrier of the second planetary gear set (P2);

a sun gear of the second planetary gear set (P2) is connected to the fourth shaft (4) which is connectable with the transmission housing (G) via the second brake (04);

a ring gear of the third planetary gear set (P3) is connected with the transmission housing (G);

the output shaft (2) is connected to a carrier of the third planetary gear set (P3) and a ring gear of the fourth planetary gear set (P4); and the first planetary gear set (P1) is blockable by engagement of the first clutch (13, 36) such that, when blocked, the sun gear, the planet carrier and the ring gear of the first planetary gear set (P1) all rotate together in unison with one another.

2. The multi step transmission according to claim 1, wherein the first clutch (13 or 36) one of detachably connects the third shaft (3) to the drive shaft (1), and
detachably connects the third shaft (3) to the sixth shaft (6).

3. The multi step transmission according to claim 1, wherein the first, the second, the third and the fourth planetary gear sets (P1, P2, P3, P4) are minus planetary gear sets.

4. The multi step transmission according to claim 2, wherein a first forward gear is achieved by engagement of the second brake (04) and the second and the fourth clutches (35, 58);

a second forward gear is achieved by engagement of the first, the second and the fourth clutches (13 or 36, 35, 58);

a third forward gear is achieved by engagement of the second brake (04) and the first and the fourth clutches (13 or 36, 58);

a fourth forward gear is achieved by engagement of the second brake (04) and the third and the fourth clutches (17, 58);

a fifth forward gear is achieved by engagement of the second brake (04) and the first and the third clutches (13 or 36, 17);

a sixth forward gear is achieved by engagement of the first, the second and the third clutches (13 or 36, 35, 17);

a seventh forward gear is achieved by engagement of the second brake (04) and the second and the third clutches (35, 17);

an eighth forward gear is achieved by engagement of the first brake (03) and the second and the third clutches (35, 17), a ninth forward gear is achieved by engagement of the first and the second brakes (03, 04) and the third clutch (17); and the reverse gear is achieved by engagement of the first and the second brakes (03, 04) and the fourth clutch (58).

5. A multi step transmission of a planetary design for an automatic transmission for a motor vehicle, the multi-step transmission comprising:

a drive shaft (1);

an output shaft (2);

first, second, third and fourth planetary gear sets (P1, P2, P3, P4) which are arranged within a transmission housing (G); and a rotatable third shaft (3), a rotatable fourth shaft (4), a rotatable fifth shaft (5), a rotatable sixth shaft (6), a rotatable seventh shaft (7) and a rotatable eighth shaft (8) as well as at least six shift elements (03, 04, 13, 17, 35, 36, 58) comprising first and second brakes (03, 04) and first, second, third and fourth clutches (13, 17, 35, 36, 58) whose selective engagement produces different transmission ratios, between the drive shaft (1) and the output shaft (2), so that nine forward gears and a reverse gear can be achieved;

wherein a sun gear of the first planetary gear set (P1) is connected to the drive shaft (1);

a carrier of the first planetary gear set (P1) is connected to the third shaft (3) which is connectable to the transmission housing (G) via the first brake (03), the third shaft (3) is detachably connectable, via the second clutch (35), to the fifth shaft (5), the fifth shaft (5) being permanently connected with both a ring gear of the second planetary gear set (P2) and a sun gear of the fourth planetary gear set (P4), and the fifth shaft (5) is detachably connectable, via the fourth clutch (58), to the eighth shaft (8) which is connected to a sun gear of the third planetary gear set (P3);

the drive shaft (1) is detachably connectable to the seventh shaft (7) which is connected to a carrier of the fourth planetary gear set (P4) via the third clutch (17);

the sixth shaft (6) is permanently connected to a ring gear of the first planetary gear set (P1) and a carrier of the second planetary gear set (P2);

a sun gear of the second planetary gear set (P2) is connected to the fourth shaft (4) which is connectable with the transmission housing (G) via the second brake (04);

a ring gear of the third planetary gear set (P3) is permanently connected with the transmission housing (G);

the output shaft (2) is connected to a carrier of the third planetary gear set (P3) and a ring gear of the fourth planetary gear set (P4); and the first planetary gear set (P1) is blockable by engagement of the first clutch (13, 36) such that, when blocked, the sun gear, the planet carrier and the ring gear of the first planetary gear set (P1) all rotate together in unison with one another.

* * * * *